July 18, 1933.  J. KINZY  1,918,813
CAMERA CASE
Filed Feb. 2, 1932  2 Sheets-Sheet 1
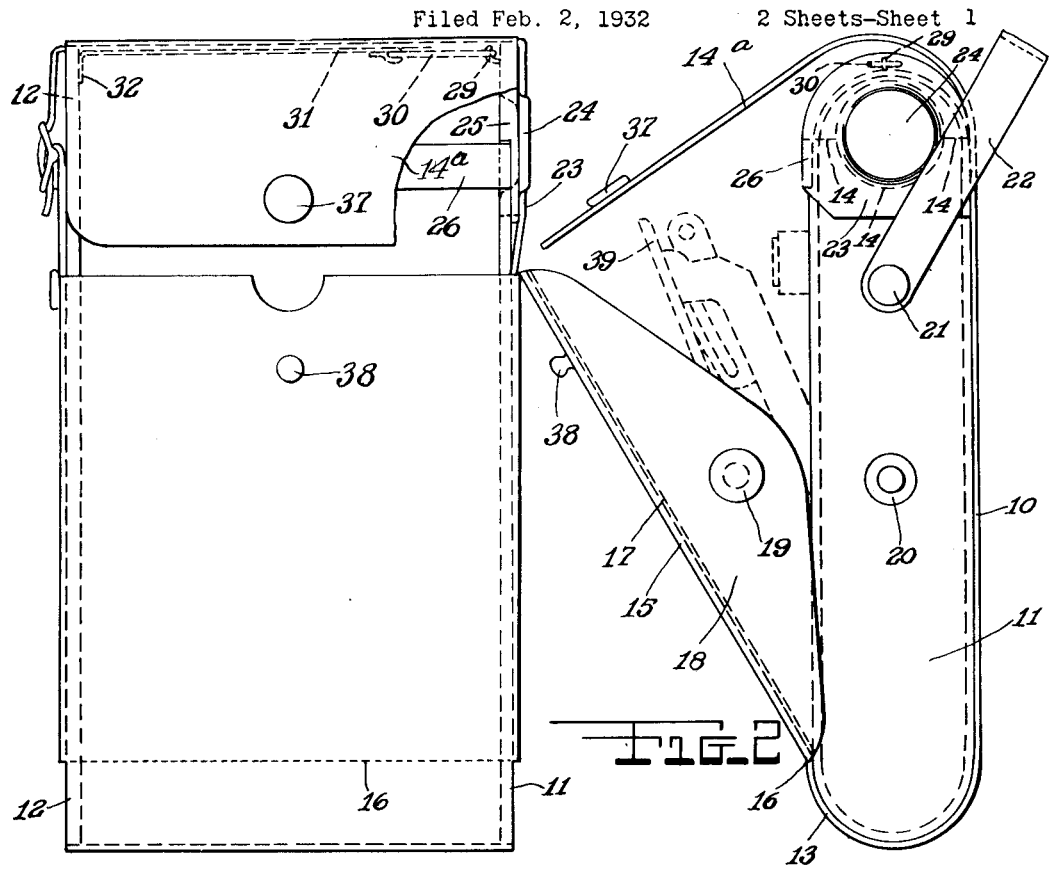
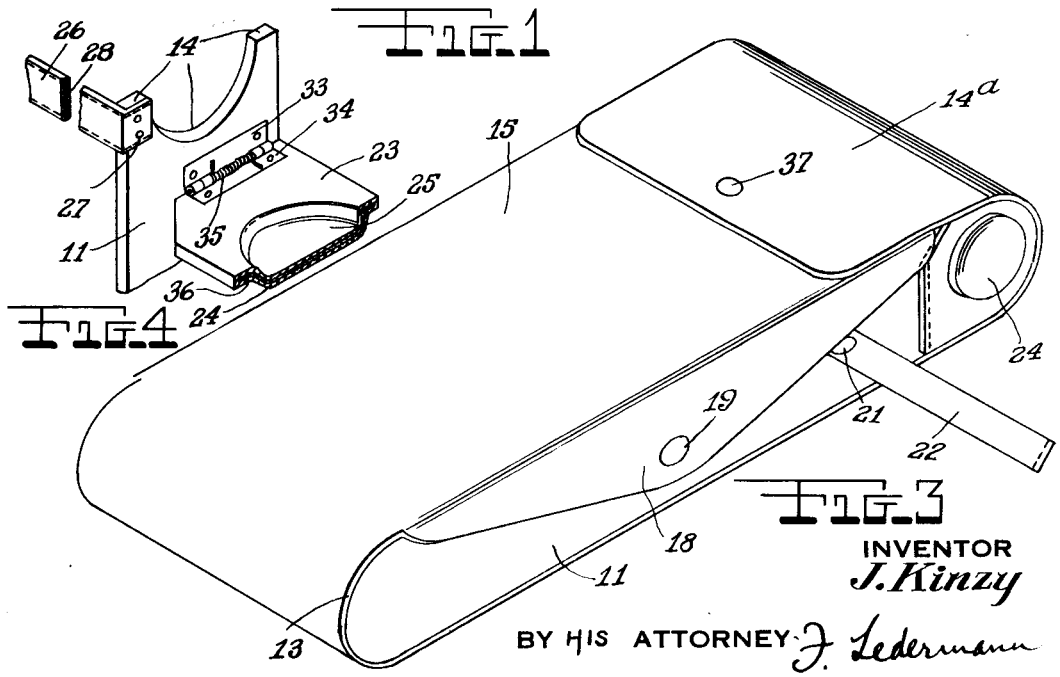
INVENTOR
J. Kinzy
BY HIS ATTORNEY J. Ledermann July 18, 1933.    J. KINZY    1,918,813
CAMERA CASE
Filed Feb. 2, 1932    2 Sheets-Sheet 2
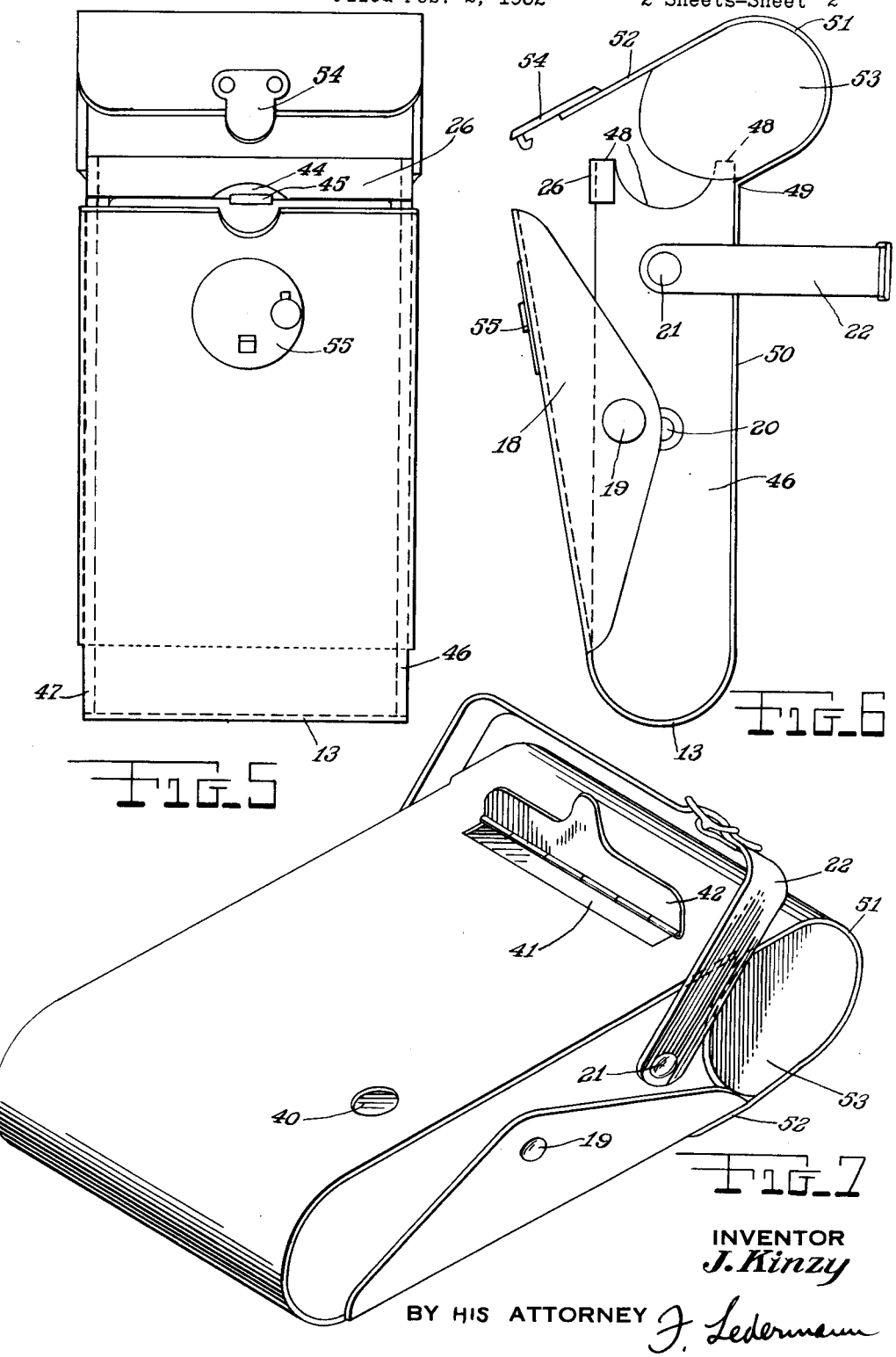

Patented July 18, 1933

1,918,813

UNITED STATES PATENT OFFICE

JACOB KINZY, OF BROOKLYN, NEW YORK

CAMERA CASE

Application filed February 2, 1932. Serial No. 590,381.

The main object of this invention is the provision of a case for cameras, the case being so constructed that the camera may be used in its usual way without removing the camera from the case.

Another object of the invention is the provision of such a case with means whereby the case, when closed about the camera, securely contains the camera in enclosed condition, in the same manner as the ordinary case.

Still another object of the invention is the provision of a camera as above-described, so that one may snap a photograph of interest immediately, even though the camera be in the case, without having to lose the time ordinarily required to first remove the camera from the case.

The above and other objects of the invention will become apparent in the description below, in which characters of reference refer to like-named parts in the drawings.

Referring briefly to the drawings, Figure 1 is a front view of one form of case, opening ready for use.

Figure 2 is a side view of the same.

Figure 3 is a perspective view of the case, closed.

Figure 4 is a perspective view of a detail of the case.

Figure 5 is a front view of a modified form of case, opening ready for use.

Figure 6 is a side view of the same.

Figure 7 is an inverted perspective view of the modified form, closed.

Referring in detail to the drawings, the numeral 10 represents the rear wall of the case, and 11 and 12 the side walls. The curved bottom of the case is shown at 13. The side wall 11 extends upward to its upper boundary line 14, shown dotted in Figure 2. The curved portion of this boundary results from providing a semi-circular cut-out at the upper end of this wall. At a level with the horizontal portion of the border line 14, the rear wall, which is throughout the remainder of its length stitched or otherwise secured to the side wall 11, free of said side wall, and continues from that line in the form of a hinged flap 14ª, the curved part of the latter providing the top wall of the case. The wall 12 continues from bottom to top, that is, from the curved bottom 13 to the curved part of the flap 14ª, and is stitched to the rear wall 10 from the bottom to the same horizontal level represented by line 14. The flap 14ª, rear wall 10, and bottom wall 13, are all parts of the same piece of leather or the like, and the front wall 15 is formed of a continuation of the same piece, extending from the upper edge 16 of the bottom 13. The upper edge 16 is shown dotted in Figure 1. This front wall is provided with a layer of cardboard or the like 17 to stiffen and strengthen the same, as the weight of the camera lies thereupon when being used. The front wall is foldable about the edge 16 to open or close the case, and is provided with buttoned side flaps 18 whose buttons 19 engage bosses 20 on the side walls to lock the case in closed position.

Pins having widened heads 21 are secured on opposite side walls to pivotally supported a carrying strap 22 which, when the case is supported therefrom, extends vertically above the top of the case, and when the camera is being used is folded into the position shown in Figure 2.

An ear 25 is sewed on, or otherwise secured, to the upper edge of the wall 11, and is provided with a circular embossed portion 24, the dished-out recess 25 on the inner side of which accommodates the film-winding key (not shown) of the camera. The upper edge of the wall 11 is cut out in the form of a semi-circle, as indicated by the curved part of the line 14, for the same purpose.

As shown in Figure 4, a cross-member 26 is secured to the upper ends of walls 11 and 12 by bolts or the like 27. This member comprises a reinforcing metal bar 28 covered with leather, the metal bar being provided to strengthen the member, as this member holds the upper end of the camera in the case when the camera has been opened and is ready for use. In order to hold the ear 23 in position alined with wall 11 when the camera case is closed, a hook 29 is secured to the upper end of the ear, and this hook is engaged by an eyelet 30 extending from the end of an elastic band 31, the latter being attached to the upper edge of the wall 12. An alternative construction to serve the same purpose is illustrated in Figure 4, in which the two leaves of a hinge, 33 and 34, are imbedded in the wall 11 and ear 23, respectively, and are normally urged into closed or parallel position by a spring 35. The ear 23 is also reinforced by a metal plate 36 imbedded therein.

In order to take a photograph with the camera in the case, assuming that the case is closed as shown in Figure 3, the button 37 on flap 14 is withdrawn from the boss 38 on the wall 15, whereupon, because of the inherent stiffness of the leather, the flap 14 will assume the position shown in Figure 2. The buttons 19—20 are then opened, and the front wall 15 is drawn downward; Figure 2 shows the same in partly extended position. When the wall 15 is in horizontal position, the upper edge of the front wall of the camera, 39, shown dotted in Figure 2, is grasped and pulled outward and downward, until it rests on the inside of wall 15. When the film roll is to be turned to bring the next film into position, the strap 22 is turned into the position shown in Figure 2, or farther if necessary, and the eyelet 30 is disengaged from hook 29, the ear 23 being then bent outward, and the fingers of the user then have access to the film-winding screw. When the mechanism shown in Figure 4 is used to support the ear in upright position, the ear is simply forced back by the fingers, and it re-assumes vertical position when released. In Figure 7 is shown an opening 40, adapted to aline with the opening in the back of the camera through which the number of the film may be viewed, and a slot 41 having a hinged cover 42, through which the film may be autographed. Similar openings may be provided on the case shown in Figures 1, 2, and 3. It is obvious that the case, with the camera in it, may be again simply closed. It is to be noted that the cross-member 26 may be cut out as at 44, to give access to the latch 45 which is pressed in order to release the front wall of the camera prior to opening the camera.

The form shown in Figures 5, 6, and 7 differs slightly from the form just described. The side walls 46 and 47 terminate, both, in the border line 48 (Figure 6), the central portion of this line being in the form of a semicircle to provide a cut out in which the film-winding screw (not shown) registers. Above the line 49, up to which the rear wall 50 is sewed to the side walls, the rear wall is prolonged into the curved top wall 51 and flap 52. Side sections 53, which may be stiff, are secured on opposite sides of this extension or top wall, as shown, and are therefore integral with the top 51. Conventional locking means are shown at 54—55, to lock the case in closed position. Parts of this modified form which are similar to those previously described, are similarly numbered. The operation and use of this case are obvious in view of the description of the first form.

Obvious modifications in form and structure may be made without departing from the spirit of the invention.

I claim:

In a camera case adapted to receive a camera therein, means for opening said case to permit using the camera without removing the camera from the case, said means comprising a front wall hinged to said case at its lower end and adapted to support the extended camera thereon when in extended position, a cross-member joining the upper ends of the side walls of said case and adapted to support in vertical position the upper end of the front wall of the camera while said camera is being opened, one of said side walls being shorter than the other and having an ear hinged to its upper end, said upper end of said wall having a semi-circular cut-out therein, the diameter of said cut-out being coincident with the upper-most horizontal edge of said wall, said ear having a similar semi-circular recess dished-out of the inner wall thereof adapted to receive the film-winding key of the camera when said ear is in normal vertical position, and a coiled spring for retaining said ear in vertical position to cover said wall recess when the case is closed, said dished-out recess in the latter position of said ear registering against said cut-out.

JACOB KINZY.